United States Patent Office 3,518,089
Patented June 30, 1970

3,518,089
PROCESS FOR MAKING SHERRY WINE
Hans Warkentin, Fresno, Calif., assignor to Vie-Del Company, a corporation of Nevada
No Drawing. Filed May 15, 1967, Ser. No. 638,608
Int. Cl. C12g 1/00
U.S. Cl. 99—35        5 Claims

ABSTRACT OF THE DISCLOSURE

Sherry wine is made by combining an ordinary wine with ascorbic acid, or materials similar in chemical nature to ascorbic acid, and allowing the wine to stand for a short period of time. Preferably the wine is heated and aerated during at least part of the time.

BACKGROUND OF THE INVENTION

Field of the invention.—Manufacture of Sherry Wine.

Description of the prior art.—The various known Sherry making methods start with a wine of 14.5–21% alcohol and bring about changes which result in a wine type having a characteristic Sherry Wine aroma and flavor. All known methods use either heat, flor yeasts, time, air, or oxygen, or a combination of the above, to produce Sherry Wine. Flor yeasts are used in Spanish Type Sherries and require several years to complete the sherrification process. California Sherries are produced by heating the wine to 120–140° F. for several months. The Tressler process used in the Eastern U. S. uses heat and strong aeration for prolonged periods of time to first destroy the strong "foxy" aroma of Labrusca type grapes and then to develop a Sherry character. Some Sherries are made by slow natural ageing in oak barrels at only moderate temperatures: this method requires several years and is quite costly. Another recent process produces, in 1–2 weeks, with a combination of flor yeasts and strong aeration under pressure, a very high aldehyde wine which is usable only as a blending wine with conventional California Sherries.

While the mechanism of Sherry flavor and aroma production is largely unknown, there is some evidence to show that changes in proteins and/or amino acids are involved in the essential reactions leading to Sherry formation. Alcohol also appears to be a necessary constituent as are traces of copper and/or iron. Sherries made by all methods show an increase in aldehyde content suggesting that oxidative changes take place during sherrification.

SUMMARY OF THE INVENTION

Sherry Wine is produced by adding to an ordinary wine ascorbic acid or a material similar in chemical nature to ascorbic acid such as isoascorbic acid or reductic acid. Although the reaction goes at room temperature, it is ordinarily preferable to heat the wine to a temperature of about 100° to 120° F. and to aerate the wine. In a matter of a few days, a typical Sherry bouquet is produced which would require from several months to several years in conventional Sherry Wine processes. The amount of the ascorbic acid-like material can be quite small i.e. from 0.01 to 0.25% by weight. Larger amounts can be used but the increased amounts do not speed up the process or result in a better product and thus are expensive and wasteful.

DESCRIPTION OF THE PREFERRED EMBODIMENTS

The present invention differs from all known methods in that a small amount of a powerful reducing agent is used to greatly accelerate the sherrification process. The role of the reducing agent is not fully understood but it is believed that a series of oxidation-reduction reactions are either caused or catalyzed by the reagent to result in a rapid sherrification of the wine. That catalysis may be involved is suggested by the small amount of reagent required. The reagent found most useful is ascorbic acid, which is present to a small extent in grapes but is destroyed during fermentation. Materials of a similar chemical nature may be employed such as isoascorbic acid or reductic acid.

It was found that when a small amount of ascorbic acid is added to a wine, sherrification will take place even at summer temperatures in containers open to the air. It is desirable, however, for better process control and reduced processing time to add the ascorbic acid and heat the wine to 100–120° F. with light aeration. In this manner in a period of a few days a Sherry bouquet is produced which in conventional processes requires from several months to several years. Great flexibility with the present process is possible by varying the temperature, heating time, the amount of ascorbic acid and the addition of none to moderate amounts of air (or oxygen). In this manner varying degrees of sherrification are obtained to produce light delicate pale dry Sherries as well as heavy cream Sherries. The economic advantages of the present process are manyfold:

(1) It produces a superior quality Sherry Wine because the brief processing time prevents many undesirable changes and side reactions due to bacteria, extended thermal decomposition, extended plant handling and yeast autolysis.

(2) It produces this Sherry in a few days instead of the several months to several years of conventional processes. The great economic importance of this time saving is obvious since it reduces the number of processing tanks, steam, alcohol losses, and labor.

(3) By this process no treatment with carbon is generally needed to remove off odors or excessive color of the newly made Sherry.

(4) The Sherry produced by this process is clean, without the usual harshness of new Sherries and will age in a few months to a degree usually found only in Sherries that have aged from one to several years.

(5) A completely fermented wine may be used in this process, while for California type baked Sherries made in accordance with the prior art, at least a small amount of residual reducing sugar is necessary.

(6) The Sherry aroma and taste produced by this process is between that of the best California baked Sherries and Sherries produced by slow natural sherrification requiring several years.

Other substances may be used to bring about sherrification of wine, such as isoascorbic acid or reductic acid. In general, organic substances of structure similar to ascorbic acid, which are powerful reducing agents and capable of forming peroxides as intermediary compounds in their reaction with the components of wine can produce sherrification. The quantity is preferably from 0.01% to 0.25% by weight although larger quantities can be used.

Example 1

To each of several 4 ounce bottles containing 100 ml. of a white wine of 20% alcohol was added: none, 0.3 g., .05 g., and .07 g. of ascorbic acid. Each bottle was then loosely stoppered with a wad of cotton and placed in an oven at 120° F. After 4 days all samples with added ascorbic acid showed a definite light Sherry character, while the sample with no ascorbic acid showed no sherrification even after 12 days in the oven.

Example 2

To a drum containing 40 gallons of white wine were added 74 grams of isoascorbic acid. Twice each day, about 1 hour each time, the wine was heated by circulation through a steam heated tube to a temperature of about 120° F. At the end of 5 days no isoascorbic acid was left and the wine had acquired an amber color, a Sherry bouquet and an aldehyde content of 51 p.p.m.

Example 3

To a 4 ounce sample of a 20% alcohol white wine in an 8 ounce bottle was added .03% reductic acid. The bottle was loosely stoppered with a small wad of cotton and placed in an oven and held at 40° C. After 5 days the wine had a bouquet resembling Sherry wine. The same wine without reductic acid showed no sherrification even after 10 days at 40° C.

I claim:
1. A process of making Sherry Wine comprising adding to wine having an alcohol content of at least 14.5% at least 0.01% of an ascorbic acid-like material selected from ascorbic acid, isoascorbic acid and reductic acid and allowing the wine to stand in the presence of oxygen until it has acquired the characteristic sherry color and bouquet.
2. The process of claim 1 wherein said material is ascorbic acid.
3. The process of claim 1 wherein said material is isoascorbic acid.
4. The process of Example 1 wherein the wine is maintained at a temperature of about 120° F. during at least a portion of the sherrification period.
5. The process of Example 1 wherein the wine is aerated during at least a portion of the sherrification period.

References Cited

UNITED STATES PATENTS 2,181,839   11/1939   Tressler _____ 99—48 X

OTHER REFERENCES

Amerine et al.: The Technology of Wine Making. The Avi Publ. Co., Westport, Conn., 1960 (pp. 192 and 193).

Fessler, J. H., Erythorbic Acid and Ascorbic Acid as Antioxidants in Bottled Wines. American Journal of Enology and Viticulture. Publ. by the American Society of Enologists, vol. 12, 1961 (pages 20–24).

Amerine et al., The Technology of Wine Making. 2nd ed. The Avi Publ. Co. Inc., Westport, Conn., May 8, 1967 (pp. 257–258).

LIONEL M. SHAPIRO, Primary Examiner

D. M. NAFF, Assistant Examiner

U.S. Cl. X.R.

99—48